Jan. 20, 1959　　R. A. DEIBEL ET AL　　2,869,167
WINDSHIELD CLEANER
Filed July 22, 1955　　2 Sheets-Sheet 1
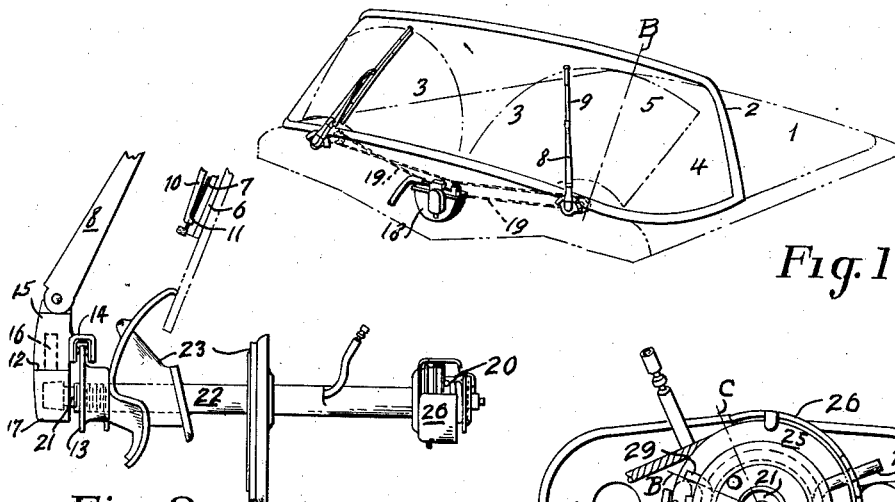
Fig. 1
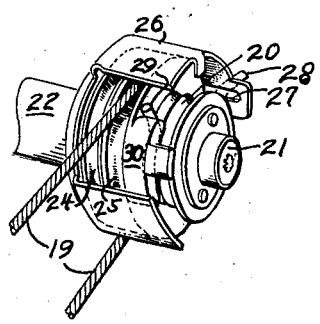
Fig. 2
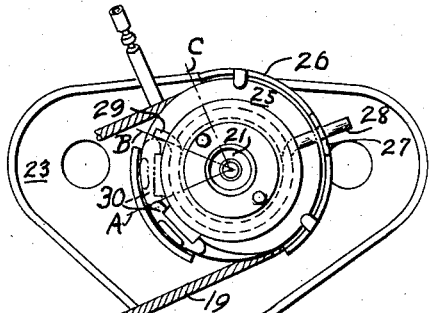
Fig. 3
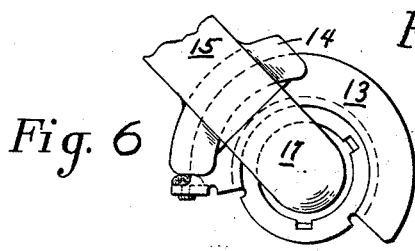
Fig. 5
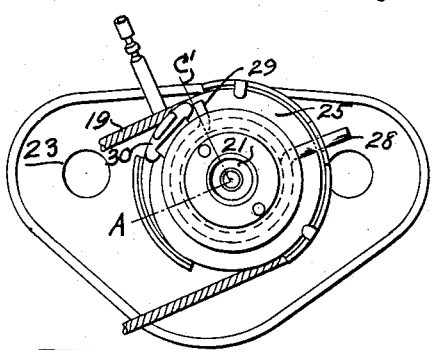
Fig. 4
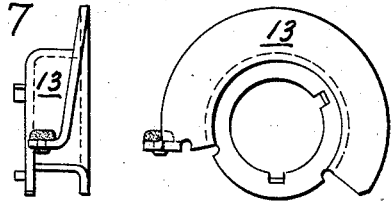
Fig. 6
Fig. 7
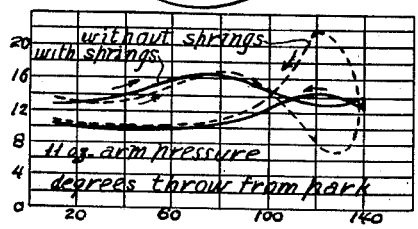
Fig. 15
Fig. 8
INVENTORS.
Raymond A. Deibel
BY and Martin Bitzer
Beau, Brooks, Buckley & Beau
Attys Jan. 20, 1959   R. A. DEIBEL ET AL   2,869,167
WINDSHIELD CLEANER
Filed July 22, 1955                                   2 Sheets-Sheet 2
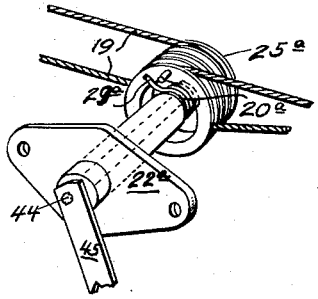
Fig. 10
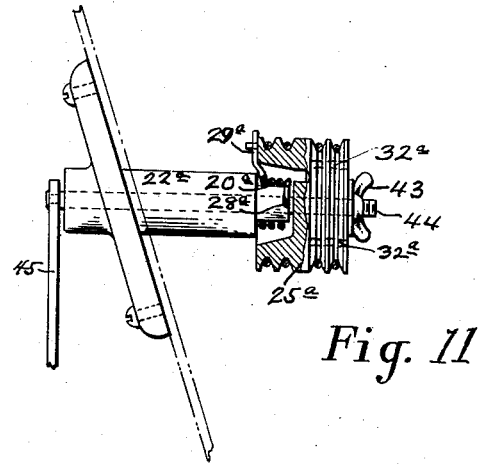
Fig. 11
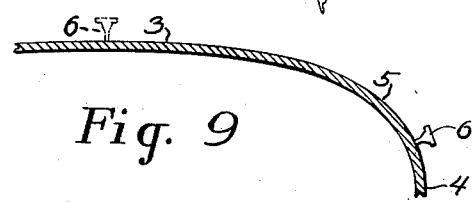
Fig. 9
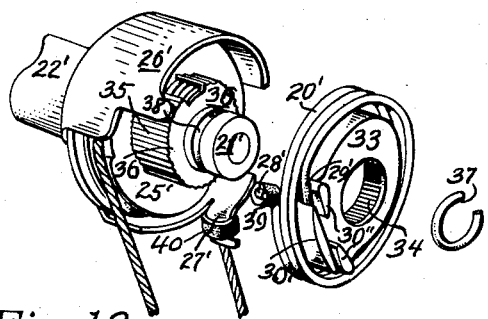
Fig. 12
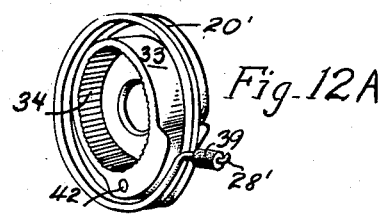
Fig. 12A
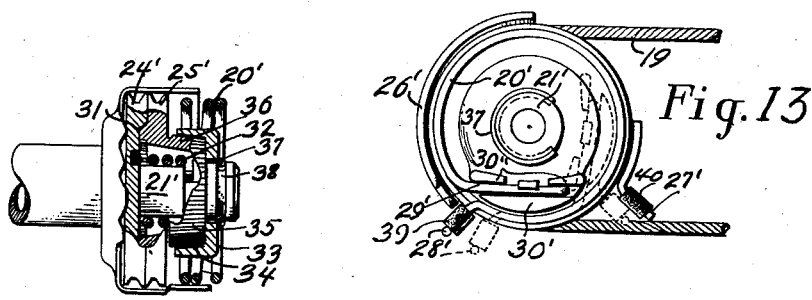
Fig. 14
Fig. 13
INVENTORS
Raymond A. Deibel
and Martin Bitzer
BY
Beau, Brooks, Buckley & Bean
attus.

United States Patent Office 2,869,167
Patented Jan. 20, 1959

2,869,167

WINDSHIELD CLEANER

Raymond A. Deibel, Cheektowaga, and Martin Bitzer, Kenmore, N. Y., assignors to Trico Products Corporation, Buffalo, N. Y.

Application July 22, 1955, Serial No. 523,803

8 Claims. (Cl. 15—253)

This invention relates to the windshield cleaning art and has particular reference to a mechanism for cleaning deeply curved windshields, sometimes referred to as the panoramic type, the same having frontal and lateral areas joined by a relatively sharper crest portion to provide a wide field of vision heretofore obstructed by the formerly used corner posts.

In the earlier curved windshields extending from one corner post to the other the surface contour was effectively cleaned by surface conforming wipers carried by a spring pressed arm and embodying a wiping blade supported by a flexible backing strip to which the arm pressure was applied at longitudinally spaced points through a pressure distributing super-structure incorporating one or more pressure equalizing yokes. The advent of the panoramic type of windshield which eliminated the necessity of the corner posts by reason of the crest formation and lateral extension of the transparency, required the windshield wiper to shape around the crest and continue its stroke down over the lateral area, and in order to maintain for all practical purposes the normal attitude of the wiper throughout its stroke it became necessary to incorporate position controlling means within the wiper mechanism in accordance with the earlier Patent No. 2,691,186. As the oscillating wiper moved on its upward stroke over the crest and down the lateral area the load imposed upon the motor was lightened in contrast to the relatively heavier load imposed upon the motor to bring the wiper up over the lateral and crest areas on its reverse stroke. Such a situation imposed load variations within a wide range upon the central power plant of the cleaner system and subjected the interposed power transmission to widely varied strains and stresses which manifested themselves in the stroking action of the wiper which would have a fast outward travel and a slower inward travel. During its faster outward movements the inertia in the arm and wiper unit would be more pronounced and effect a whipping action at its moment of reverseal along with an annoying attendant noise of operation.

The primary object of this invention is to provide an improved mechanism by which the wiper reversal is accomplished in a smooth, quiet manner for more effectively accomplishing its intended purpose.

Another and equally important object of the invention is to provide an improved mechanism by which the load imposed upon the motor is maintained substantially constant, or with little variation, throughout the entire wiping operation.

In the illustrated embodiments of the invention, energy storing means, such as a torsion spring, is provided for absorbing a potential energy derived from the motor torque as transmitted through a cable transmission and augmented by the inertia factor of the arm and blade as it passes out over the crest and downwardly toward the lower molding of the shield. Upon the reversal of the motor, the stored energy asserts itself to provide part of the torque required to raise the arm and its wiping blade upwardly on the side area and over the crest.

By means of the energy storing spring, the torque load on the motor, during the travel of the blade and arm across the frontal section, over the crest and down the lateral section of the shield, is rendered substantially uniform to more nearly resemble the normal load of operation if confined solely to the flatter frontal area. In other words, the spring tends to counterbalance the inertia factor and downhill acceleration in the outward stroke of the wiper, and energy force which the spring stores up in its tighter coil form is made available for the return movement of the wiper.

A still further object of the invention, therefore, is to provide an arrangement by which an energy storing supplemental load is imposed upon the motor during the out stroke of the wiper during its downhill travel over the crest and lateral areas for subsequent expenditure after the moment of wiper reversal for assisting the motor in bringing the wiper back uphill, thereby serving to maintain a uniform load on the motor throughout its operation.

The invention will also be found to reside in a windshield cleaner for the panoramic type of windshield substantially devoid of over travel or whip at the end of its out stroke by reason of the employment of means to absorb or counteract the force of inertia through a gradual retard of the wiper in its outward travel sufficient to cushion the wiper to a stop at a predetermined and controlled position for the start of its inward stroke.

The load modifying spring serves in the capacity of an equalizer for producing a more constant wiping action. The equalizer spring functions only during the arcuate movement of the blade and arm after the arm has passed out beyond the perpendicular position, at the zenith of the arc of travel. On the return stroke from the outboard in the direction of the inboard movement the equalizer will likewise function only through substantially the same degree of blade travel. So in the outboard and inboard directions, the unit performs its service of adding to the efficiency of the motor and the transmission linkage.

During the periods of car travel at relatively higher car speeds, air currents are encountered which, in the modern windshield of the curved style, divide with currents moving outwardly to the left and right of the windshield. These currents are exerting the wind force to push the blades outwardly at the time when the equalizer springs are being energized. Thus, in addition to the inertia factor, the wind-up of the equalizer spring gains, to a noticeable degree, through the assist of the wind pressure thus applied. Both of these forces, the inertia and the wind pressure, store up potential energy in the spring for use in both lifting the blade and arm weight and in aiding the return movement of the blade against the wind currents that tend to place a heavier load on the motor on the instroke.

Actually, there are four forces tending to reduce the energy requirement in the outboard movement: (1) gravity, (2) unidirectional courses of air impingment on the arms and blades, (3) the camming effect between the windshield and the wiper blades to lower (and lift up again) the resilient spring loading means for applying wiping pressure to the windshield, the friction of movements in the arm pivot joints making this factor of still greater proportions, and (4) the variable friction of the blade over the windshield under the different pressures of wiping contact; on the way out these pressures being reduced because of the friction of the spring loaded moving parts in the arm and on the way back the wiping pressure being increased by the same friction, placing a heavier load on the drive.

All of these forces call for a greater energy requirement on the return movement. The spring absorbs the energy released by these elements on the way out and uses that energy to overcome them on the way back. The counterbalanced spring therefore absorbs the surplus motor energy that is released by the operation of these forces while the blade goes out and this energy is returned by the spring to help overcome these same forces and reduce the total amount of energy required from the motor to bring the blade back.

The equalizer unit works constructively as a counterbalance to produce a smooth even speed of travel for the wiping blade in both directions. The spring is designed to proportion its effort in accordance with the build up of the requirements from the several forces above described. These forces which tend to reduce the torque load on the motor are small at their beginning, near the vertical positions of the blades. As the blades move out these forces increase in magnitude toward the outward extremity. Gravity, wind stream urge, down hill camming, and wiping pressure reduced by friction of the moving parts of the arm, permit the building up of spring energy in this one direction of movement for use to assist the motor in the movement of the blades on the way back. The counterbalance spring has been designed and proportioned so as to follow the pattern of change in the forces involved and build up its effort at substantially the same rate as the build up of the aggregate of these forces.

The foregoing and other objects will manifest themselves in the following description, references being made therein to the accompanying drawings in which Fig. 1 is a fragmentary perspective view of a motor vehicle showing the improved windshield cleaning system applied thereto;

Fig. 2 is a fragmentary side elevation of the improved wiper mechanism showing the load modifying means incorporated in one of the driven wiper oscillating shafts;

Fig. 3 is an inner end view of the shaft of Fig. 2 showing the load modifying unit inoperative;

Fig. 4 is a similar view but showing the load modifying unit in action;

Fig. 5 is a perspective view of the unit;

Fig. 6 is a front elevation of the wiper normalizing means;

Figs. 7 and 8 are edge and front elevations, respectively, of the wiper normalizing cam;

Fig. 9 is a schematic view showing the wiper in different attitudes on different areas of the windshield, the latter being shown substantially in horizontal section as viewed in Fig. 1;

Fig. 10 is a perspective view of a modified embodiment of the present invention as incorporated in a centralized driver;

Fig. 11 is a side elevational view of the embodiment of Fig. 10;

Fig. 12 is a perspective view similar to that of Fig. 5 but being exploded to show a further modification;

Fig. 12A is an inside perspective view of the spring and its retainer illustrated in Fig. 12;

Fig. 13 is an end elevation of the modified embodiment of Fig. 12, showing the load modifying unit in different positions;

Fig. 14 is a side elevation of the embodiment shown in Fig. 12 with parts broken away from clarification; and Fig. 15 is a graph comparing the load variations in the windshield cleaning system with and without the load modifying counterbalancing spring unit.

Referring more particularly to the drawings the numeral 1 designates a motor vehicle having a windshield 2 of the panoramic type which is so shaped as to provide a frontal portion 3, a side portion 4, and a joining crest portion 5, the frontal and lateral areas being relatively flat as compared to the more sharply curved crest area 5 and all uniting to afford a broader field of vision for safe driving. It further provides a continuous surface contour of compound curvature for wiping by an oscillatory wiper to maintain a clear wide field of vision during inclement weather. The wiper is flexible for conforming to this surface contour and may comprise a rubber blade 6 carried by a flexible backing strip 7 to which the pressure of a spring pressed arm 8 is distributed through a jointed superstructure 9 having a yoke 10 with terminal claws 11 slidably grasping the opposite side margins of the backing strip in a manner to hold the latter against uncontrolled lateral rocking about its longitudinal axis, all in a well known manner.

For the early curved windshields such wipers would effectively conform to the slight curvature therein, but when employed on the panoramic windshield the superstructure of the wiper would lie dangerously close to the surface when on the lateral area, so much so that sometimes it would scratch the glass and impair the vision therethrough. The ideal wipe is accomplished when the wiping blade is maintained substantially at a normal to the surface, and in order to maintain this ideal relationship the modern automobile has more recently been equipped with the invention of the above entitled patent for adjusting the attitude of the wiper as it moves around the crest onto the lateral area. This necessitates a pivotal joint 12 in the wiper carrying arm in order to have its outer blade carrying part 15 to rock laterally on its longitudinal axis under the control of a fixed pattern cam 13 and a cooperating follower 14 on the normalizing section 15. This section is pivoted on a pin 16 projecting from the inner mounting section 17. Fig. 9 shows a horizontal section through the crest portion of the windshield with the broken lines showing the wiper on the frontal area 3 and the full lines depicting the wiper on the lateral area 4 after it has passed around the crest area 5. From this diagrammatic showing, it will be understood that the wiping blade maintains an attitude that is substantially normal to the immediate surface being wiped, such normalizing adjustment having been effected through its position-controlling cam 13 and its coacting follower 14.

Upon starting its inward stroke, the wiping blade will move upwardly over the lateral area 4 until it reaches the crest area 5 where its ascent is moderated somewhat as it continues its inward travel over the frontal area. During its outward travel, the wiper moves in a downward direction which has the effect of lessening the load imposed upon the source of power, herein depicted in the form of the well-known suction operated motor 18, through the cable transmission 19. The return or inward stroke, however, necessitates an uphill travel and consequently imposes a heavier load on the motor. The result is an irregular or non-uniform operation of the motor, causing an accelerated movement toward the end of the out stroke followed by a deceleration on the inward stroke. The inertia of the outward stroke is therefore unchecked and results in a thumping sound that is amplified by its mounting within the motor vehicle body. This sudden acceleration and deceleration has a telling effect on the power transmitting cables 19 which necessitates their tensioning adjustment.

In accordance with the present invention, load modifying means are provided to accomplish this wiping action through a load imposing mechanism compensating to increase the load on the motor during the descent of the wiper on its out stroke and to decrease the load for the ascent of the wiper on the reverse stroke. To this end resilient means are provided to cushion the outward movement in a manner to store up energy for immediate use in assisting the uphill travel of the wiper on its inward stroke.

In the embodiment depicted in Figs. 2 through 8, a load modifying member in the form of a coiled spring 20 is mounted on the pivot shaft 21 that has journal bearing support in a mounting sleeve 22 which in turn is secured in place by bracket members 23. The cable 19 may be divided and each section secured to a respective one of the two drums 24 and 25, a construction which incorporates a tensioning or slack absorbing spring for imparting relative movement between the two drums when the latter are disconnected one from the other. Such a construction may be seen in an earlier Patent No. 2,661,492 from which it will be observed that the relative movement between the drum sections 24 and 25 will absorb slack in the cable transmission and that thereafter they will be fixedly related to rotate as a unit. A guard member 26 encloses this composite drum structure to hold the cables in position. It has a seat 27 in which one end 28 of the coiled spring 20 is anchored, its opposite end 29 bearing upon a lug 30 formed on the adjacent side of the drum section 25 so that when engaged with the lug the spring terminal may be moved thereby in a spring winding direction to store up energy for subsequent expenditure in reversing the drum movement. Preferably, the load modifying springs 20 are free of the lug 30 while the wipers are moving over their respective frontal areas 3, the extent of this angular movement being indicated by the broken lines A and B in Fig. 3, and as the wipers continue in their outward strokes the drum carried lugs will engage the spring terminals 29 at a time approximately when the wipers move onto the opposite crest areas 5 and from there on the the lug will wind the springs throughout the descent of the wipers over the areas 5 and 4, the extent of this angular energy storing movement being indicated by the lines B and C in Fig. 3. This combined angular movement of each pivot shaft 21 is designated by the broken lines A and C' in Fig. 4. In Fig. 1 the line B corresponds to the line B in Fig. 3 where the spring tensioning starts as the wiper moves outwardly over the crest and lateral areas.

The action of the load modifying members 20 is such that the springs will wind up during the descent of the wipers on the outward stroke to store up power for assisting the motor in returning the wipers back onto their frontal areas. The effect is to gradually increase the motor load outwardly and to gradually decrease it inwardly with respect to wiper travel. The overall result is two-fold. First, it gradually retards the out moving wiper to a stop for reversing it and thereby eliminates any pounding terminal noise; and secondly, it renders the motor load substantially constant throughout. Fig 15 depicts in graphic form the solid load line of the present system as compared to the broken load line of former systems of panoramic cleaning.

The advantage of quietness in operation is gained by reason of the fact that the load modifying member serves to absorb the inertia force in the outward swinging wiper and arm assemblies as it brings the wipers gradually to a stop. At the start of their next in stroke, they receive an initial boost which tapers off by the time the frontal areas are reached over which they move free of the spring terminals 29.

It will be appreciated that this load modifying action is accomplished without altering the slack absorbing function of the divided drum with its enclosed spring. Such an enclosed spring is shown in the embodiment illustrated in Fig. 12, 12A, 13 and 14 wherein the drum sections 24' and 25' have intermeshing teeth at 31 to secure them together until released, as for example by loosening a clamp nut, whereupon the enclosed spring 32 will impart relative movement between the drum sections for restoring cable tautness.

In this embodiment the load modifying member is made adjustable to more accurately fit it to the contour pattern and to restore it, should wear occur. To that end the coil spring 20' is held by a retainer cap 33 having an inner wall serrated at 34 for selective engagement with the serrations 35 formed on the hub 36 of the drum section 25', a C-ring 37 being inserted in a groove 38 of the shaft 21' for securing the retainer cap 33 in its operative position. The spring 20' has its terminal 29' anchored between upstanding lugs 30' and 30", while its opposite terminal 28' is designed to engage a shoulder 27' on the cable guard member 26'. For quietness, the spring terminal 28' may be equipped with a rubber sleeve 39. Likewise, the anchoring shoulder 27' may be covered with a rubber sleeve 40 to arrest the terminal 28' for the wind-up of the spring.

During its operation, the spring terminal 28' will idly move from its broken line position, Fig. 13, until arrested and thereafter the spring will wind up as the drum continues to rotate and carry with it the terminal 29' thereby to impose an equalizing load upon the motor during the outward descent of the wiper. The retainer cap 33 may be formed with an aperture 42 into which the spring terminal 29' may be downturned to effect the desired anchorage.

In operation the C-ring 37 will be removed to permit the retainer 33 being disengaged and rotatably adjusted to tension the spring 20' to the desired degree and thereafter the retainer will be reengaged with the serrations 35 on the hub and secured in place by the C-ring. By having the load modifying springs remain idle during the wiping of the frontal areas they may be made heavier to move effectively check the wipers and absorb their inertia after moving outwardly over the crest and lateral areas of the windshield. This silences the reversal action as well as expedites the uphill return travel of the wiper.

In the foregoing embodiments, the load modifying means have been located in the driven wiper oscillating shafts 21. Such load modifying means may be incorporated elsewhere in the transmission, such as is shown at 20a in the embodiment of Figs. 10 and 11 wherein one terminal 28a of the spring is anchored to the shaft support 22a while the opposite end has a play connection with the drum, as indicated at 29a. In this embodiment the drum 25a may be provided with cable tensioning posts 32a which are spring projected to take up cable slack and thereafter securely fixed by a clamp nut 43, as is shown more clearly in copending application Serial No. 472,323. The drum is fixed on a drive shaft 44, which may be the shaft of the motor, or it may be carried by an interposed shaft in turn connected through a mechanical connection 45 to the motor.

Normally the wipers will be parked inwardly against the bottom molding of the windshield and during this parking movement the load modifying spring 20, 20', 20a, will idle. When the windshield cleaner is turned on, the two wipers will move over the frontal areas unaffected by the load modifying spring or springs, as the case may be, until the play has been absorbed and the springs engaged as the wiper moves outwardly over the crest 5. Thus, the wipers couple themselves automatically to the load modifying springs for insuring substantial uniformity of wiper movement and a steady motive drive both down and up the lateral areas. In tests made, the load modifying spring drops the vacuum requirement for the motor 18 and levels off the torque load, the graph of Fig. 15 showing a wide variation in pounds-inches in the torque load with and without the load modifying spring.

The wiper shafts 21 are slidably mounted in their supporting bearings for axial as well as pivotal movement for ready response to the pattern cam 13.

The function of the load modifying embodiment, in the ultimate, provides a windshield cleaner system for wiping the broad fields of vision found in the panoramic type of windshield with a practical uniformity in the load requirement. It further provides for quietness of operation while utilizing the motive power together with the inertia force for building up a reserve source of power subject to immediate demand by the wipers for their uphill travel at the start of the instroke.

The foregoing description has been given in detail for clarity and ease of understanding and without thought of limitation since the inventive concept is capable of assuming other physical embodiments without departing from the spirit of the invention and the scope of the appended claims.

What is claimed is:

1. A windshield cleaner comprising a wiper, actuating means therefor operable to oscillate the wiper across a frontal area and down on a crest and lateral area of an associated windshield, and load-modifying means operatively free of said actuating means during movement of the wiper on such frontal area and automatically engageable by said actuating means only during down movement on such crest and lateral area to store up spring energy for subsequent expenditure during up movement on such crest and lateral area thereby to compensate for the differential torque loads on the crest and lateral areas relative to the normal torque load on the frontal area.

2. A cleaner for a windshield having an outwardly receding surface, comprising a wiper carried by a spring-loaded arm, an automatic motor operable to impart an out stroke to the wiper initially under a substantially uniform constant torque load and thence downwardly over the receding windshield surface under a lighter torque load and an in stroke upwardly over the receding surface under a heavier torque load, and an intermittently operable auxiliary power element operating substantially only during wiper travel over the receding surface to absorb energy during the out stroke drop off in the power load on said motor, said auxiliary power element acting when the wiper is reversed by the action of said automatic motor to expend its stored-up energy through the heavier torque load portion of the in stroke, the motor being automatically freed of the auxiliary power element as the wiper continues its in stroke under such uniform torque load.

3. A cleaner for clearing an irregularly curved windshield having a surface imposing variable resistance to wiper movement with more torque load in one direction and less torque load in the opposite direction of movement, an automatic motor, a wiper oscillatable thereby, and a wiper load modifying mechanism for storing a potential energy derived during the easier travel of the wiper in its outward movement in one direction over the surface where lessened friction is encountered, said mechanism acting automatically to deliver such potential energy for assisting the travel of the wiper in the other direction, said mechanism being arranged to function substantially midway between the opposite terminals of wiper movement to free the motor from said mechanism toward the inner terminal of wiper movement.

4. A windshield cleaner comprising a spring pressed wiper, actuating means therefor operable to oscillate the wiper in an arc terminating downwardly in an outward direction, said actuating means including a part movable back and forth in a given path, and a load boosting spring having a portion interposed in said path intermediate the ends thereof and operatively engageable by said part only during the out stroke of the wiper to absorb energy for subsequent expenditure at the start of the in stroke of the wiper, and means for relatively varying that point in the wiper stroke at which said spring becomes operative.

5. A windshield cleaner comprising a spring pressed wiper, actuating means therefor operable to oscillate the wiper and including a power transmitting member composed of relatively rotatable parts, and a spring anchored at one end to one part and its opposite end engageable by the other part during movement of the wiper outwardly to store up energy in the spring and thereby impose an added torque load on the actuating means for retarding the wiper, said spring acting to expend its stored energy during movement of the wiper inwardly and being automatically releasable from the other part during such inward movement of the wiper to unload the actuating means of the spring.

6. A windshield cleaner comprising a spring pressed wiper, actuating means therefor operable to oscillate the wiper and including a power transmitting member composed of relatively rotatable parts, a spring anchored at one end to one part and its opposite end engageable by the other part during movement of the wiper outwardly to store up energy in the spring and thereby impose an added torque load on the actuating means for retarding the wiper, said spring acting to expend its stored energy during movement of the wiper inwardly and being automatically releasable from the other part during such inward movement of the wiper to unload the actuating means of the spring, and means adjustably connecting one part to the other part to vary the amount of energy stored for subsequent expenditure.

7. A cleaning mechanism for a windshield having frontal and lateral areas joined by a relatively sharper corner portion forming a crest area, said mechanism comprising a wiper, an arm pressing the wiper upon said areas, means for oscillating the arm up over the frontal area and around the crest area and then down over the lateral area on its out stroke and in opposite direction on its in stroke, said wiper moving from the crest area down over the lateral area more easily and providing less loading on its oscillating means than when moving back up over the lateral area, and normally idle load modifying means storing up spring energy solely during wiper movement outwardly over the combined crest-lateral areas and expending such energy solely during the first part of the reverse stroke prior to idling again on the frontal area, said load modifying means acting gradually to arrest the wiper on its out stroke and to initially boost the wiper on its in stroke and thereafter taper off with said oscillating means assuming the entire load across the frontal area.

8. A cleaning mechanism for a windshield having frontal and lateral areas joined by a relatively sharper corner portion forming a crest area comprising, a wiper, an arm pressing the wiper upon said areas, means for oscillating the arm up over the frontal area under a constant torque load and around the crest area and down over the lateral area on its out stroke under a lighter torque load and up over the lateral and crest areas on its reverse stroke under a relatively heavier torque load and normally inoperative spring means acting during the descent of the wiper to increase the load on said oscillating means above that presented by the wiper on its out stroke and to decrease the load thereon below that presented by the wiper on its in stroke in a manner tending to maintain the load on said oscillating means substantially constant throughout said strokes.

References Cited in the file of this patent

UNITED STATES PATENTS

| 930,185 | Jones | Aug. 3, 1909 |
|---|---|---|
| 1,017,661 | Foster | Feb. 20, 1912 |
| 1,451,698 | Kelber | Apr. 17, 1923 |
| 1,544,835 | Greenberg | July 7, 1925 |
| 2,079,399 | Drew et al. | May 4, 1937 |
| 2,082,485 | Evans | June 1, 1937 |
| 2,494,538 | Baldo | Jan. 17, 1950 |
| 2,661,492 | Oishei | Dec. 8, 1953 |
| 2,691,186 | Oishei | Oct. 12, 1954 |
| 2,790,990 | Wallis | May 7, 1957 |

FOREIGN PATENTS

| 625,499 | France | Aug. 11, 1927 |
|---|---|---|
| 645,731 | France | Oct. 30, 1928 |
| 765,235 | Germany | Nov. 15, 1954 |